May 15, 1956 　　　J. H. SCHMID 　　　2,745,551
SEPARATOR
Filed March 12, 1951

INVENTOR.
John H. Schmid
BY
Florian G. Miller
Atty.

United States Patent Office 2,745,551
Patented May 15, 1956

2,745,551

SEPARATOR

John H. Schmid, Erie, Pa., assignor to J. A. Zurn Mfg. Co., Erie, Pa., a corporation of Pennsylvania Application March 12, 1951, Serial No. 215,049

9 Claims. (Cl. 210—43)

This invention relates generally to separating devices and more particularly to separating devices for matter in liquid or solid form of varying densities.

Prior separating devices are not adapted to take care of fluid entering the separator at a high velocity, and particularly where there is heavy fluctuation of the velocity. These heavy fluctuations have resulted in considerable variation in the head of the fluid in the separator and separation of the solid matter from the liquid matter, and particularly separation of the flotatable matter from the predominant liquid, has been very inefficient, thereby resulting in the escape of a considerable amount of the solid and liquid matter in flotation from the separator. These prior separators had a very small capacity for carrying matter in flotation.

It is, accordingly, an object of my invention to overcome the above and other defects in separators and it is more particularly an object of my invention to provide a separator for matter of varying densities which is simple in construction, economical in cost, economical in manufacture, and efficient in operation.

Another object of my invention is to provide a separator for matter of varying densities wherein the pressure of the liquid matter is equalized and the velocity of flow of the liquid is made more uniform.

Another object of my invention is to provide a separator for matter of varying densities in which a container with an apertured baffle is provided for equalizing the velocity of flow of the fluid and for containing the heavier particles in the fluid.

Another object of my invention is to provide a separator for matter of varying densities which maintains the fluid level in the separator within close limits under wide variations of rate of flow to the separator.

Another object of my invention is to provide a separator for matter of varying densities which utilizes the principles of flotation and gravity.

Another object of my invention is to provide a separator for matter of varying densities which permits wide variations in the height of liquid and solid matter in flotation.

Another object of my invention is to provide a horizontal weir in a separator for matter of varying densities.

Another object of my invention is to provide a separator for matter of varying densities wherein a minimum change in the efficient operation of the separator is made by a change in the rate of flow and regardless of the height of the floating solid or liquid matter in the separator.

Another object of my invention is to provide a separator for matter of varying densities which separates one or more lighter liquids or solids from one or more heavier liquids or solids.

Another object of my invention is to provide a trapped air vent in a separator for matter of varying densities.

Another object of my invention is to provide a vertically adjustable, open take-off pipe for removing the liquid fluids and solids in flotation in the separator.

Other objects of my invention will become evident from the following detailed description, taken in conjunction with the accompanying drawings, in which—

Figure 1:
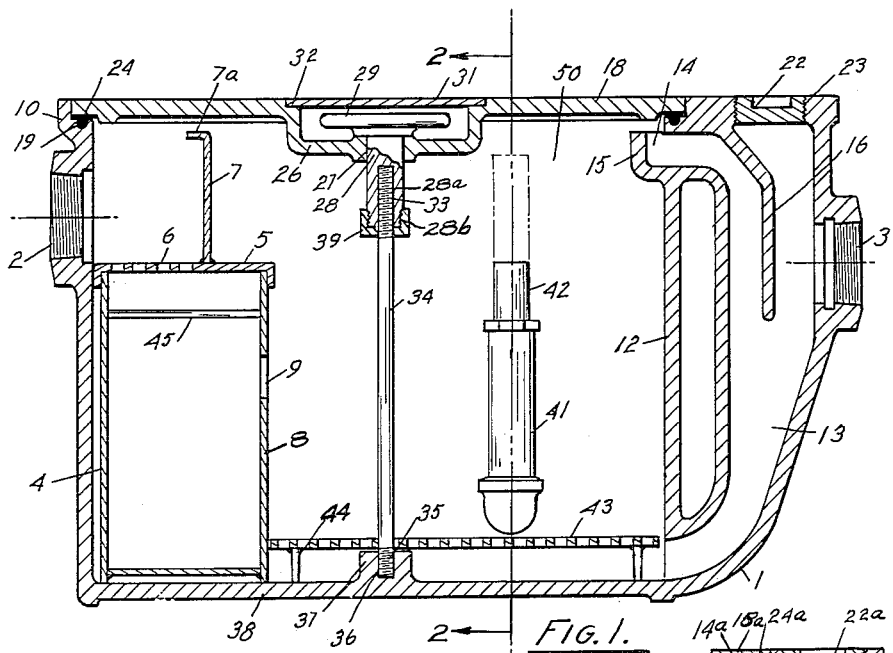
Fig. 1 is a transverse vertical sectional view of my novel separator.
Figures 2, 3:
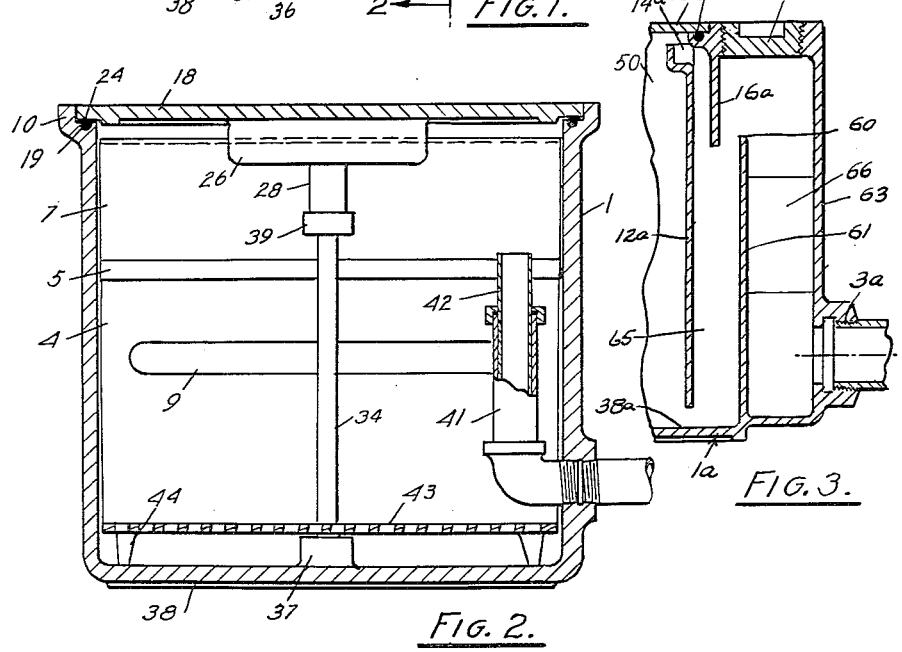
Fig. 2 is a view taken on the line 2—2 of Fig. 1.
Fig. 3 is a fragmentary transverse sectional view of the outlet end of a modified form of my novel separator.

Referring now to the drawings, I show in Figs. 1 and 2 a container 1 having an internally threaded inlet aperture 2 and an internally threaded outlet aperture 3 in opposite upper ends thereof for attachment to suitable piping. A rectangular shaped box-like reservatory or tank 4 has a flanged cover 5 with an apertured portion 6 in substantially the same horizontal plane as the lower side of the inlet aperture 2 of the container 1. The cover 5 has a transversely extending, vertical baffle 7 flanged toward the inlet aperture 2 at 7a secured thereto. The side 8 of the tank 4 has a horizontally extending opening or weir 9 which extends substantially the transverse width of the tank 4 and the container 1. The vertically extending baffle 7 and the horizontally extending apertured portion 6 of the cover 5 cause the incoming fluid to make a right angled turn and the apertured portion 6 of the cover 5 tends to equalize the pressure of the fluid entering the tank 4, spread the flow of fluid across the entire width of the tank 4, and it also tends to equalize the pressure and the rate of flow of the fluid passing through the container 1. A depending baffle 12 transversely of the container 1 and spaced from and adjacent the outlet aperture 3 thereof depends from the top 10 of the container 1 and is spaced from the bottom of the container 1 to provide a passage 13 to the outlet aperture 3. An air vent passage 14 is formed in the upper portion of the baffle 12 by means of an offset lip 15 on the baffle 12 and a depending baffle 16 intermediate the baffle 12 and the outlet aperture 3. The baffle 16 depends below the outlet aperture 3 a sufficient distance to provide a seal of the passageway 14 under normal flow of fluid to the outlet aperture 3; however, the passageway 14 provides a ready escape of gases from the container 1 when the seal is broken. The lip 15 extends approximately to the under side of the top cover 18 of the container 1 in order that there will be no normal overflow of liquid through the air vent passage 14. The removable cover 18 seats in a marginal groove 19 in the top 10 of the container 1. A threaded cleanout plug 22 is disposed in a threaded aperture 23 in the top 10 of the container 1 to clean out the passageway 13. A suitable sealing member 24 is provided for sealingly engaging and seating the cover 18. The cover 18 has a cylindrical, cup shaped depending portion 26 formed centrally thereof with an aperture 27 for receiving an internally threaded shaft 28 with a handle 29 mounted on the upper end thereof. A removable cover 31 is disposed in a marginal groove 32 around the cup shaped depending portion 26 of the cover 18. The shaft 28 has a threaded bore 28a for receiving the threaded end 33 of a rod 34 which has the lower end thereof threaded at 35 for threadable engagement with a threaded aperture 36 in a raised, bossed portion 37 in the bottom 38 of the container 1. An internally threaded cap 39 threadably engages the externally threaded portion 28b of the shaft 28 to secure it in the aperture 27.

The weir 9 preferably extends horizontally substantially the entire width of the container 1 although it is not necessary that it extend the entire width of the container so long as it is a substantially greater width than the diameter of the outlet aperture 3. The height of the weir 9 is determined by determining the normal static head of the predominant liquid in the container and then disposing the weir 9 a predetermined distance therebeneath so that surging of the fluid in the tank 4 is necessary to force it through the opening 9. The discharge from the weir 9 is in a comparatively thin sheet of liquid distributed over the full width of the container 1 thus assuring that the flotatable material in the container 1 is not appreciably disturbed, regardless of the variations in the rate of flow of fluid into the inlet aperture 2. With my novel construction, there is little chance for a siphoning action tending to empty the container 1 along with all of the solid and liquid matter in flotation therein. The fluid in the container 1 is maintained in a more or less quiescent state permitting the flotation of less dense matter of fluid or solid form on the surface of the predominant liquid. This is particularly important in oil separation. The predominant fluid maintains a level in the container 1 within very narrow limits regardless of the rate of flow of the fluid entering the inlet aperture 2 inasmuch as the opening 9 is of a width approximating the width of the container 1. This level will be maintained regardless of the amount of matter in liquid or solid form floating on the surface of the level of the predominant liquid within reasonable limits.

A vertically extending pipe 41 with a telescoping sleeve 42 is set at a predetermined level to skim off the flotatable liquids or solids from the predominant fluid in the separating chamber 50. The height to which the sleeve 42 is set is determined by the average rate of flow of the fluid entering the inlet aperture 2 of the container 1 and by the differential head between liquid in the separating chamber 50 and in the outlet passageway 13 due to difference in density and accumulated oil or the like. A horizontal baffle 43 having legs 44 is disposed on the bottom 38 of the container 1 between the tank 4 and the baffle 12 to remove any solid matter in the fluid passage to the outlet aperture 3. The tank 4 has a transversely extending bar 45 to provide a handle to remove it from the container 1. The baffle 43 may also be removed from the container 1 by removing the cover 18 therefrom. The cover 18 is removable by removing the cover 31 and rotating the handle 29 of the shaft 28 which frees it from the rod 34.

In operation, combined matter in solid and fluid form from any source enters the inlet aperture 2 and the baffle 7 causes it to make a right angled turn and it is dispersed by the apertured portion 6 of the cover 5 of the repository or tank 5, thereby equalizing the pressure of the fluid entering the inlet aperture 2 and tending to make the velocity of the flow of fluid passing through the container 1 more uniform. Non-flotatable solid particles are retained in the repository or tank 4. It has been found that my novel separator is particularly adapted for separating lighter oils from heavier immiscible oils and oils from water. Oils have been found to carry a large percentage of solid particles. When the fluid reaches the height of the weir of opening 9, it passes into a separating chamber 50 formed between the tank 4 and the baffle 12 until it reaches the level of the outlet aperture 3 whereupon it passes therefrom to a drain line. It will be evident that the level of the fluid in the separating chamber 50 will be at a higher level than the weir 9. The liquid in the repository or tank 4 must, therefore, surge through the weir 9 to get liquid to the outlet aperture 3. This surging action tends to remove all non-flotatable solid matter from the fluid in the repository or tank 4. The fluid in the separating chamber 50 is maintained in a more or less quiescent state permitting the flotation of less dense matter of fluid or solid form on the surface of the predominant liquid. The predominant liquid maintains a level in the container within very narrow limits regardless of the rate of flow of the fluid entering the inlet aperture 2 inasmuch as the weir 9 is of a width approximating the width of the container 1 and increase of the head of the fluid passing therethrough is comparatively small upon any multiple increase in the rate of flow. This level will be maintained regardless of the amount of matter in liquid or solid form floating on the surface of the level of the predominant liquid within reasonable limits.

In Fig. 3, I show a modified form of my invention in which a horizontal weir 60 which extends transversely the entire width of container 1a is formed by a baffle 61 extending upwardly from the bottom of the outlet end of the container 1a, the weir 60 being spaced a predetermined distance from the outlet end 63 of the container 1a wherein an outlet aperture 3a is disposed in the lower portion thereof. A depending baffle 12a spaced laterally from the baffle 61 and from the bottom 38a of the container 1a forms a passageway 65 for the flow of fluid over the weir 60 to a spillway 66 leading to the outlet aperture 3a. An air vent passageway 14a is provided between a depending baffle 16a which depends below the level of the weir 60, and the upper portion of the baffle 12a. A cover 18a for the container 1a, a seal 24a for the cover 18a, and a clean-out plug 22a are the same as the corresponding cover 18, seal 24, and clean-out plug 22 shown in Figs. 1 and 2. All other parts of the container 1a are the same as the container 1 shown in Figs. 1 and 2. The operation of the separator shown in Fig. 3 is practically the same as that previously described for the separator shown in Figs. 1 and 2 except that the weir 60 in the outlet end of the container supplements the action of the weir 9 to spread out transversely the flow of fluid in the container to the entire width of the container, thereby minimizing any increase in the head of the liquid in the separating chamber 50 of the container.

A transverse wall spaced from the inlet aperture 2 with a weir the same as the weir 9 in the side of the tank 4 may be provided instead of the complete tank 4; however, I prefer the use of the tank 4.

It will be evident from the foregoing description that I have provided an inexpensive separator for matter of varying densities and one which is particularly adapted for separating lighter from heavier oils or water from oil which provides a tank for retaining solid matter in the fluid to be separated with a surging action therein to completely shake out all of the solid matter in the matter to be separated, which maintains a level of the fluid in the separator within narrow limits under all circumstances by the use of a weir, which prevents siphoning action through the outlet aperture, which maintains the flotatable liquids in the separating chamber in a comparatively quiescent state, and which provides a means for permitting the predominant fluid in the separator to discharge under all circumstances. My separator also permits a greater amount of fluid and solid matter in flotation in the separating chamber because there is a minimum of change of level of the predominant fluid in the container.

Various changes may be made in the specific embodiment of my invention without departing from the spirit thereof or from the scope of the appended claims.

What I claim is:

1. A separator for matter of varying densities comprising a container having an inlet and an outlet, and a transverse wall in said container spaced from said inlet defining a separating tank having a transversely extending, horizontal, elongated opening spaced upwardly a predetermined distance from the bottom of said container, said wall causing surging of liquid on the inlet side thereof whereby solid matter is deposited and retained on the inlet side of said wall and it does not pass to the outlet side of said wall and said opening distributing the flow of liquid transversely in said container, said separating tank having the top side thereof apertured and having an upwardly extending baffle in the path of liquid entering through said inlet in said container to disperse the liquid to be separated entering said inlet.

2. A separator for separating matter of varying densities comprising a container having an inlet aperture and an outlet aperture, a tank disposed transversely of said container adjacent said inlet aperture having a horizontally extending, elongated opening in the outlet side thereof disposed below the outlet aperture in said container, said container having a cover, an inlet opening in the cover thereof, a transversely extending baffle disposed on said cover in the path of matter entering said container for deflecting the matter to said tank, a depending baffle in said container adjacent the outlet aperture therein spaced from the bottom thereof, and a pipe extending through the side of the tank and extending upwardly thereinto, said pipe having an opening at the upper end thereof serving as a take-off member in said container between said tank and said depending baffle for skimming off the matter in flotation on the predominant matter in said container.

3. A separator as set forth in claim 2 wherein said depending baffle has a transverse passage for air in the upper end thereof and a second depending baffle disposed between said outlet end of said container and said first mentioned depending baffle extends below said outlet aperture defining a passage for air.

4. A separator as set forth in claim 2 wherein an apertured horizontal baffle is disposed in said container between said tank and said first mentioned depending baffle.

5. A separator for matter of varying densities including a liquid comprising a container having an inlet and an outlet in opposite upper ends thereof, a tank having the upper side thereof apertured and having an elongated horizontal opening across the wall on the outlet side thereof, an upwardly extending baffle attached to the top of said tank in the path of the flow of matter into said container for deflecting the matter into said tank, a depending baffle spaced from said outlet in said container and from the bottom of said container, the portion of said container between said tank and said depending baffle defining a separating chamber, and a take-off member in said chamber for skimming off flotatable material on the predominant matter therein, said opening in said tank being below said outlet.

6. A separator as set forth in claim 5 wherein said depending baffle has an air vent passageway in the upper end thereof leading to a passage formed by a second depending baffle spaced therefrom between said depending baffle and said outlet and extending below said outlet.

7. A separator as set forth in claim 5 wherein said take-off member is a vertically adjustable pipe.

8. A separator as set forth in claim 5 wherein an apertured horizontal baffle is disposed in said separating chamber spaced from the bottom of said container.

9. A separator as set forth in claim 5 wherein an upwardly extending baffle is disposed between the outlet end of said container and said first mentioned depending baffle defining a horizontal weir above said outlet.

References Cited in the file of this patent

UNITED STATES PATENTS

| | | |
|---|---|---|
| 911,314 | Maranville | Feb. 2, 1909 |
| 1,121,270 | McDermott | Dec. 15, 1914 |
| 1,237,068 | Loeb | Aug. 14, 1917 |
| 1,702,612 | Morse | Feb. 19, 1929 |
| 1,959,623 | Gordon | May 22, 1934 |
| 2,059,844 | Boosey | Nov. 3, 1936 |
| 2,102,429 | McLeod | Dec. 14, 1937 |
| 2,216,300 | Schenk | Oct. 1, 1940 |
| 2,284,737 | Hirshstein | June 2, 1942 |
| 2,303,109 | Boosey | Nov. 24, 1942 |
| 2,362,447 | Boosey | Nov. 14, 1944 |
| 2,576,645 | Shenk | Nov. 27, 1951 |
| 2,638,177 | Heindlhofer | May 12, 1953 |

FOREIGN PATENTS

| | | |
|---|---|---|
| 557,885 | Great Britain | Dec. 9, 1943 |